United States Patent [19]

Tzeng et al.

[11] Patent Number: 4,968,882
[45] Date of Patent: Nov. 6, 1990

[54] ADJUSTABLE OPTICAL SHAFT ENCODER AND CALIBRATION METHOD FOR PRINTERS AND PLOTTERS

[75] Inventors: Paul S. Tzeng, Fountain Valley; Richard Mansueto, Huntington Beach, both of Calif.

[73] Assignee: Calcomp Inc., Anaheim, Calif.

[21] Appl. No.: 341,857

[22] Filed: Apr. 24, 1989

[51] Int. Cl.$^5$ .............................................. G01D 5/34
[52] U.S. Cl. .................................. 250/231.14; 226/45
[58] Field of Search ........ 250/231 SE, 237 G, 231.14; 226/45; 33/707

[56] References Cited

U.S. PATENT DOCUMENTS 4,293,774 10/1981 Pongracz ............................... 226/45
4,513,898 4/1985 Spitsbergen ............................ 226/45

Primary Examiner—David C. Nelms
Attorney, Agent, or Firm—Donald A. Streck; Wm. F. Porter, Jr.

[57] ABSTRACT

An apparatus such as a printer or a plotter feeds image-receiving media such as paper by rotation of a shaft, and a media position sensor responds to the rotation of a sensor roller. The apparatus includes a position sensor calibration device having an elastically deformable ring compressible between the shaft and the sensor roller and a calibrator for changing the distance between the shaft and the sensor roller so as to change the amount by which the deformable ring is compressed, in order to adjust the output of the media position sensor for a given amount of media movement. The shaft is connected to one of a pair of media-gripping pinch rollers, the one pinch roller being rotatable by the shaft, and a shaft motor is connected to the shaft. The ring is pinched between the shaft and the sensor roller. The calibrator is a screw threaded through a stationary threaded support and extending toward the sensor roller to push the roller toward the shaft and compress the elastically deformable ring. The response of the media position sensor is calibrated by rotating the screw.

18 Claims, 2 Drawing Sheets

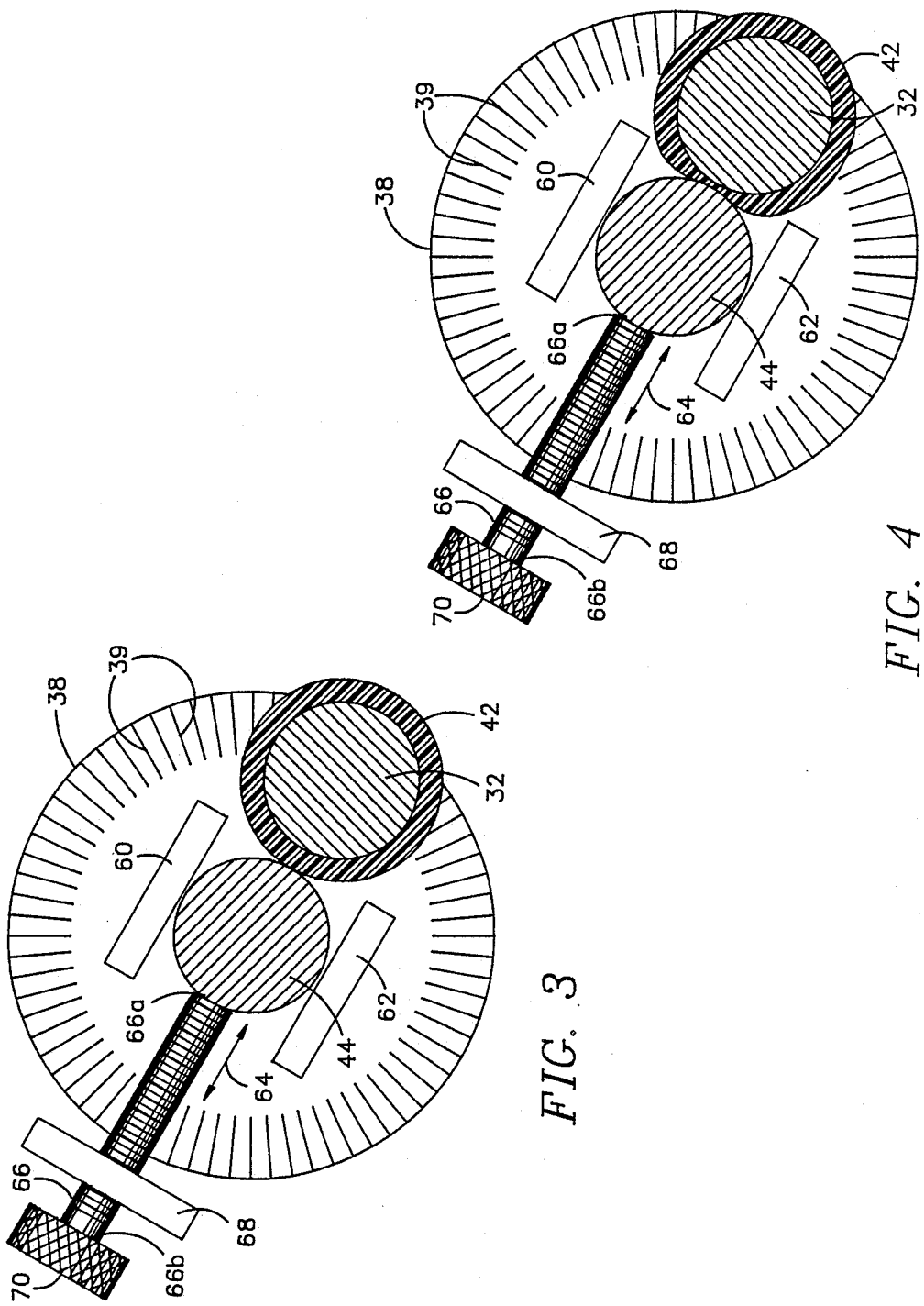

ADJUSTABLE OPTICAL SHAFT ENCODER AND CALIBRATION METHOD FOR PRINTERS AND PLOTTERS

BACKGROUND OF THE INVENTION

This invention is related to printers, plotters and similar apparatus and, more particularly, in an apparatus which transports a web media by rotatable means and includes media position sensing means for developing a signal reflecting distance moved by the media, to a calibration device comprising deformable means for variably coupling the rotation of the rotatable means to the media position sensing means and means for adjusting the amount by which the deformable means is compressed so as to adjust the response of the media position sensing means to the rotation of the rotatable means.

Sensing and controlling paper travel using a shaft encoder is a well-known and difficult problem common among various devices, including printers, plotters, facsimile machines, and others. The problem is particularly acute in devices in which the quality of an image reproduced by the device on the paper depends upon the accuracy with which the paper travel speed or position is sensed. For this reason, calibrating the device so that it accurately senses the paper travel speed or position is critical to image quality.

Referring to FIG. 1, a typical printer according to the prior art controls paper travel with two pinch rollers 10, 12 which grip the paper 11 between them with sufficient force to prevent significant slippage of the paper. The pinch rollers 10, 12 rotate on shafts 14, 16, respectively, one of the shafts 14, 16 being rotated in turn by a stepper motor (not shown), for example. In order for the control system of the printer to accurately govern paper position and travel during printing, an optical encoder disk 18 is coaxially pressed onto the shaft 16 and rotates with the shaft. The optical encoder disk 18 has a series of small periodically spaced light admitting holes (not visible in the view of FIG. 1) lying in a circular locus near its peripheral circumference. An optical shaft encoder 20 has a light emitting diode 22 and a light sensing diode 24 facing each other across the periphery of the optical encoding disk 18. As the optical encoder disk 18 rotates, the holes in the disk 18 periodically permit light from the light emitting diode 22 to impinge on the light sensing diode 24. The light sensing diode 24 therefore produces a pulsed electrical signal representative of the motion of the pinch rollers 10, 12 and therefore of the paper position and travel therethrough. Of course, the control system of the printer must be designed to associate each pair of sequential pulses from the light sensing diode 24 with the corresponding exact amount of paper travel through the pinch rollers 10, 12.

The output of the light sensing diode 24 does not accurately reflect the position or rate of travel of the paper 11 through the pinch rollers 10, 12 if the diameter of either of the rollers 10, 12 or both of them is different from that assumed by the printer control system designer. This problem is unavoidable in most printers, particularly if the pinch rollers 10 or 12 have elastically deformable circumferential surfaces for achieving a firmer grip on the paper. The degree to which these elastic surfaces are compressed varies depending upon manufacturing tolerances, and therefore the effective diameter of the pinch rollers 10, 12 is unpredictable. The problem can be alleviated by providing a signal processor at the output of the light sensing diode and by calibrating the signal processor through a trial and error procedure until the printer control system interprets the output of the optical shaft encoder correctly. However, such a signal processor is expensive and the electronic calibration thereof is undesirably complex.

U.S. Pat. No. Re. 32,775 and U.S. Pat. No. 4,586,834 disclose the use of pinch rollers to actuate paper travel in a graphics plotter and in a printer, respectively. A pair of paper-gripping pinch rollers in which one of the rollers has a non-deformable surface and the other has an elastically deformable surface deformed by the non-deformable roller with which it is engaged is disclosed in U.S. Pat. No. 4,527,174 for providing a better grip on the paper to reduce paper slippage in a plotter. U.S. Pat. No. 3,093,284 discloses a similar pair of magnetic tape-gripping pinch rollers in which one roller is elastically deformable for maintaining different magnetic recording tape speeds past two pairs of capstans in a tape recorder.

U.S. Pat. No. 3,917,142, U.S. Pat. No. 3,963,110 and U.S. Pat. No. 3,857,471 disclose an optical shaft encoder, or the like, for sensing paper motion in a printer or typewriter. Typically, the optical shaft encoder is a disk driven directly by the pinch roller or the motor which is, in turn, moving the paper through the printer. The disk has periodically spaced holes through it along its circumference and is disposed between a light emitting diode and a light sensing diode (for example). A microprocessor computes the position of the paper as it travels through the pinch rollers from the output of the light sensing diode with an accuracy or resolution determined by the number of the periodically spaced holes along the disk circumference.

The accuracy with which the optical shaft encoder senses the paper position is reduced by diameter variations or eccentricities in the pinch rollers or other members of the linkage between the paper and the encoder disk. Because finite tolerances must be employed in manufacturing printers or plotters for a reasonable or competitive cost, there is always some diameter variation or eccentricity in the rollers and shafts, as well as other sources of error, which necessarily distort to some extent the paper position sensed by the optical shaft encoder. Of course, for a specific individual printer these sources of error are generally constant and therefore the signal produced by the optical shaft encoder can be corrected using a calibrated on-board signal processor or the like. Unfortunately, such a signal processor is relatively expensive and the time to calibrate it electronically would require a time consuming trial and error computation procedure performed by a skilled worker.

The problem to be solved, therefore, is to improve image quality in a printer or plotter by removing the sources of error which reduce the accuracy of the optical shaft encoder without requiring the use of expensive or time consuming calibration devices or procedures.

Accordingly, it is an object of the invention to provide an inexpensive means of accurately calibrating the optical shaft encoder of a printer or plotter.

It is a further object of the invention to provide an inexpensive means of changing the output of the optical shaft encoder so as to accurately compensate for variations from standard values in the diameter of rollers or pinch rollers governing the paper travel in a printer or plotter.

It is yet a further object of the invention to provide an inexpensive and purely mechanical means of changing the output of the optical shaft encoder so as to accurately compensate for variations from standard values in the diameter of rollers or pinch rollers governing the paper travel in a printer or plotter requiring only the turning of a single knob using a very simple calibration procedure.

Other objects and benefits of the invention will become apparent from the description which follows hereinafter when taken in conjunction with the accompanying drawings.

SUMMARY

The foregoing objects have been achieved by the apparatus of the present invention for accurately and adjustably moving and sensing the distance travelled by an image-receiving media, comprising, means including a rotatable shaft for moving the media; a rotatable roller; means for sensing rotation of the roller and for developing an output signal reflecting a distance travelled by the media as a function of the rotation of the roller; elastically deformable means compressible between the movable roller and the rotatable shaft for coupling the rotation of the shaft to the roller; and calibration means for adjusting the amount by which the elastically deformable means is compressed between the roller and the shaft so as to control the rotational rate of the roller with respect to the rotational rate of the shaft.

In the preferred embodiment, the means for moving the media comprises a pair of gripping pinch rollers, one of the pinch rollers being rotated by the shaft. Also, the elastically deformable means comprises an elastic ring around the shaft, the ring being pinched between a circumferential surface of the shaft and a circumferential surface of the movable roller.

The preferred calibration means comprises a threaded support which is stationary with respect to the shaft and a screw threaded through the threaded support and extending toward the movable roller along a radial direction of the movable roller, the screw being engaged on an inner end with the movable roller so as to push the roller toward the shaft and compress the elastically deformable means. Additionally, there are means for constraining the movable roller to travel axially along a path parallel to the direction of the screw while permitting the rotation of the movable roller; the preferred path being along a line extending between the centers of the shaft and the roller.

DESCRIPTION OF THE DRAWINGS

FIG. 3 is a cross-sectional view of the adjustable coupler of FIG. 2 having an elastically deformable pinch roller assembly; and FIG. 4 is a cross-sectional view of the adjustable coupler of FIG. 2 in which the velocity of the optical shaft encoder has been adjusted downward by one roller deforming the elastic circumference of the other roller.

DESCRIPTION OF THE PREFERRED EMBODIMENT

While in the description which follows hereinafter reference is primarily made to a "printer", as mentioned earlier herein and as will be readily apparent to those skilled in the art, the present invention will be applicable in any environment where exact movement of a web driven by driving rollers, or the like, must be sensed. Accordingly, the scope and spirit of the invention is not to be limited by the use of a particular example for convenience.

Figure 1:
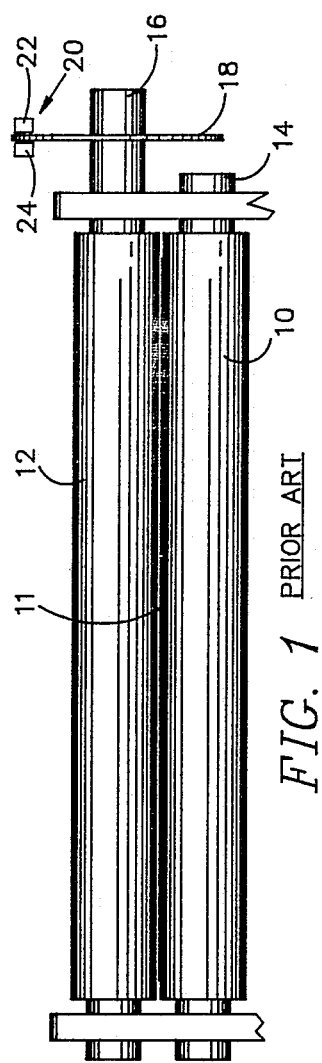
FIG. 1 illustrates an optical shaft encoder connected directly to one shaft of a paper-gripping pinch roller assembly in a printer or plotter according to the approach of the prior art.
Figure 2:
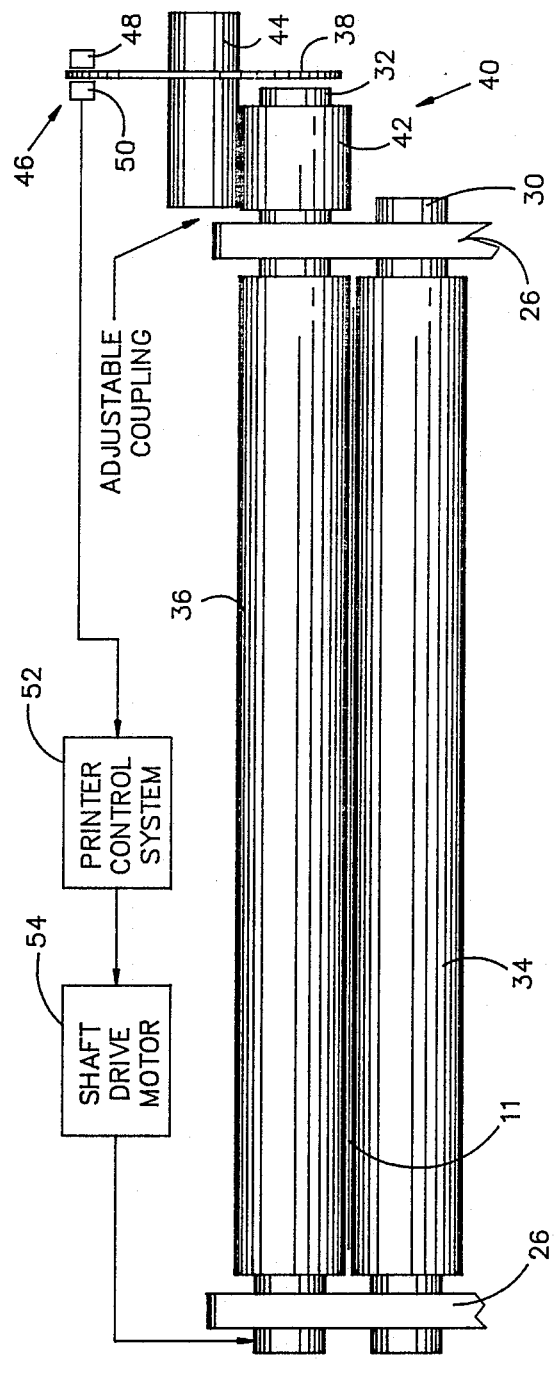
FIG. 2 illustrates one embodiment of the invention in which an optical shaft encoder is connected through an adjustable coupler to one shaft of the paper-gripping pinch roller assembly.

Referring first to FIG. 2, the preferred embodiment of the invention includes printer housing yokes 26, 28 supporting a pair of rotatable shafts 30, 32 on which a pair of paper-gripping pinch rollers 34, 36, respectively, are disposed. As is a usual practice in such apparatus, the circumferential surfaces of the paper-gripping pinch rollers 34, 36 may be of an elastically deformable material to prevent paper slippage between the pinch rollers 34, 36.

An optical encoding disk 38 is coupled to the shaft 32 through an adjustable coupling 40 comprising an elastically deformable ring 42 disposed around one end of the shaft 32 and a movable pinch roller 44 around which the optical encoder disk 38 is concentrically attached. An optical shaft encoder 46 near the periphery of the disk 38 includes a light transmitting diode 48 and a light sensing diode 50. Periodically spaced light passing areas 39 (illustrated in FIG. 3) are located in a circular locus around the circumference of the disk 38 and periodically pass and block light from the emitting diode 48 to the sensing diode 50 in synchronism with the rotation of the disk 38 in the usual manner for such optical encoding devices. A printer control system 52 uses the electrical output of the sensing diode 50 for determining the current position of the paper in the pinch rollers 34, 36 to control a shaft drive motor 54 which rotates the shaft 32. It should be noted that novelty of the present invention does not lie in the construction of the optical shaft encoder or its use in driving the shaft drive motor 54; rather, the novelty lies in the adjustable coupling 40 now to be described in detail.

The output of the optical shaft encoder 46 is calibrated by adjusting the pressure exerted by the movable pinch roller 44 against the elasticall deformable ring 42, which in turn adjusts the effective diameter of the ring 42. Such an adjustment changes the rotational rate of the pinch roller 44 (and therefore of the optical encoding disk 38) for a given rotational rate of the shaft 32. Means for performing this adjustment will now be described.

Referring first to FIG. 3, the movable pinch roller 44 is constrained by holders 60, 62 to rotate between them and to translate between the holders 60, 62 in a linear path as indicated by the arrow 64. A screw 66 threads through a stationary threaded support 68 fixed to the housing of the printer. One end 66a of the screw 66 abuts the circumference of the movable pinch roller 44, urging it toward the ring 42 and shaft 32. The shaft 32 is stationary with respect to the threaded support 68; therefore, rotation of the screw 66 changes the pressure applied by the movable pinch roller 44 to the ring 42. A knob 70 at the other end 66b of the screw 66 facilitates hand rotation of the screw.

FIG. 4 illustrates the effect of rotating the screw 66 so as to move it further in the direction of the movable pinch roller 44. The pinch roller 44 is rigid and therefore moves along the path 64 by the same distance as the screw 66. As a result, the pinch roller compresses the deformable ring 42 in the manner illustrated in FIG. 4, which changes the effective diameter of the ring 42 and the rotational rate of the encoder disk 38 for a given rotational rate of the shaft 32. This changes the number of pulses generated by the light sensing diode 50 of the optical shaft encoder 46 for a given amount of paper travel through the pinch rollers 34, 36. Thus, the optical shaft encoder 46 of the invention can be adjusted by merely rotating the finger knob 70. The preferred method of calibration contemplates the use of a calibration paper media, or the like, bearing periodically spaced square images having a accurately predetermined spacing distance. The calibration media is fed through the pinch rollers 34, 36 and the number of pulses from the optical shaft encoder 46 is counted each time the calibration media travels through the pinch rollers 34, 36 by the predetermined distance. The knob 70 is rotated until the number of pulses counted reaches the number accurately reflecting the distance the media has actually moved (or within acceptable limits).

As will be readily recognized and appreciated by those skilled in the art, the pinch roller 44 may compress a deformable circumferential surface of one of the paper-gripping pinch rollers 34 or 36, thus dispensing with the ring 32.

While the invention has been described in detail by specific reference to preferred embodiments thereof, it is understood that variation and modifications thereof may be made without departing from the spirit and scope of the invention.

Wherefore, having thus described the invention, what is claimed is:

1. Apparatus for accurately and adjustably moving and sensing the distance travelled by an image-receiving medium, comprising:
    (a) means including a rotatable shaft for moving the medium;
    (b) a rotatable roller;
    (c) means for sensing rotation of said roller and for developing an output signal reflecting a distance travelled by the medium as a function of the rotation of said roller;
    (d) elastically deformable means compressible between said movable roller and said rotatable shaft for coupling the rotation of said shaft to said roller; and
    (e) calibration means for adjusting the amount by which said elastically deformable means is compressed between said roller and said shaft so as to control the rotational rate of said roller with respect to the rotational rate of said shaft.

2. The apparatus of claim 1 wherein:
    said means for moving the medium comprises a pair of gripping pinch rollers, one of said pinch rollers being rotated by said shaft.

3. The apparatus of claim 1 wherein:
    said elastically deformable means comprises an elastic ring around said shaft, said ring being pinched between a circumferential surface of said shaft and a circumferential surface of said movable roller.

4. The apparatus of claim 1 wherein said calibration means comprises:
    (a) a threaded support which is stationary with respect to said shaft; and
    (b) a screw threaded through said threaded support and extending toward said movable roller along a radial direction of said movable roller, said screw being engaged on an inner end with said movable roller so as to push said roller toward said shaft and compress said elastically deformable means.

5. The apparatus of claim 4 and further comprising:
    means for constraining said movable roller to travel axially along a path parallel to the direction of said screw while permitting the rotation of said movable roller.

6. The apparatus of claim 5 wherein:
    said path is along a line extending between the centers of said shaft and said roller.

7. The apparatus of claim 2 wherein said means for sensing the rotation of said roller comprises:
    (a) an optical shaft encoder having an encoding disk coupled to said movable roller so as to rotate therewith, said disk having a plurality of periodically spaced light passing areas along a circumferential periphery thereof;
    (b) light generating means disposed on one side of said disk for directing a beam of light onto said circumferential periphery; and
    (c) stationary signal generating means adjacent said circumferential periphery for sensing light passing through said light passing areas of said encoding disk and for generating a representative output signal in response thereto.

8. In an apparatus such as a printer or a plotter which transports image-receiving a medium by rotation of a shaft and wherein a medium position sensor generates a signal reflecting movement of the medium as a function of rotation of the shaft, a position sensor calibration device comprising:
    (a) a roller mounted for rotation and having the medium position sensor connected thereto to sense rotation thereof;
    (b) elastically deformable means compressible between said shaft and said roller for coupling the rotation of said shaft to said roller; and
    calibration means for changing the distance between said shaft and said roller so as to change the amount by which said deformable means is compressed, whereby to adjust the signal output by the medium position sensor for a given amount of medium movement.

9. The apparatus of claim 8 wherein:
    said shaft is connected to one of a pair of medium-gripping pinch rollers, said one pinch roller being rotatable by said shaft.

10. The apparatus of claim 8 wherein:
    said elastically deformable means comprises an elastic ring around said shaft, said ring being pinched between the circumference of said shaft and the circumference of said roller.

11. The apparatus of claim 8 wherein said calibration means comprises:
    (a) a threaded support which is stationary with respect to said shaft; and
    (b) a screw threaded through said threaded support and extending toward said roller, said screw being engaged with said roller on an inner end so as to push said roller toward said shaft and compress said elastically deformable means.

12. The apparatus of claim 11 and further comprising:
    means for constraining said roller to travel axially along a path while permitting the rotation of said movable roller.

13. The apparatus of claim 12 wherein:

said path is a straight line extending between the centers of said shaft and said roller.

14. The apparatus of claim 8 wherein the medium position sensor comprises:

an optical shaft encoder having an encoding disk coupled to said roller so as to rotate therewith, said disk having a plurality of periodically spaced light admitting means along a circumferential periphery thereof and stationary means adjacent said circumferential periphery for sensing light admitted through said light admitting means and for generating a representative output signal in response thereto.

15. In an apparatus which transports a web medium by rotatable means and includes medium position sensing means for developing a signal reflecting distance moved by the medium, a calibration device comprising:

(a) deformable means for variably coupling the rotation of said rotatable means to the medium position sensing means; and (b) means for adjusting the amount by which said deformable means is compressed so as to adjust the response of the medium position sensing means to the rotation of said rotatable means.

16. The apparatus of claim 15 wherein:

the medium position sensing means responds to the rotation of a roller and wherein said deformable means comprises a deformable ring pressed around the circumference of said rotatable means and compressed by a circumferential surface of said roller.

17. The apparatus of claim 16 wherein:

said means for adjusting comprises a threaded screw supported for rotationally activated axial movement towards and away from said roller and impinging on an inner end against a circumferential surface of said roller so as to press said roller toward said rotatable means.

18. In apparatus which transports a medium by means of a rotatable means and includes medium position sensing means for generating an output signal reflecting distance moved by the medium, deformable means for variably coupling the rotation of the rotatable means to the medium position sensing means and threaded screw means for adjusting the amount by which the deformable means is compressed so as to adjust the response of the medium position sensing means to the rotation of the rotatable means, a method of calibrating the response of the medium position sensing means comprising the steps of:

(a) causing a calibration medium to be fed through the apparatus a pre-determined distance and to be sensed by the medium position sensing means;

(b) comparing the distance represented by the output signal from the medium position sensing means to the actual pre-determined distance moved by the calibration medium and terminating the calibration if the difference is less than a pre-determined amount;

(c) rotating the threaded screw means so as to change the response of the medium position sensing means to be closer to the actual pre-determined distance moved by the medium; and (d) returning to step (a).

* * * * *